(No Model.)
W. T. GOODMAN.
TWO WHEELED VEHICLE.
No. 296,949. Patented Apr. 15, 1884.
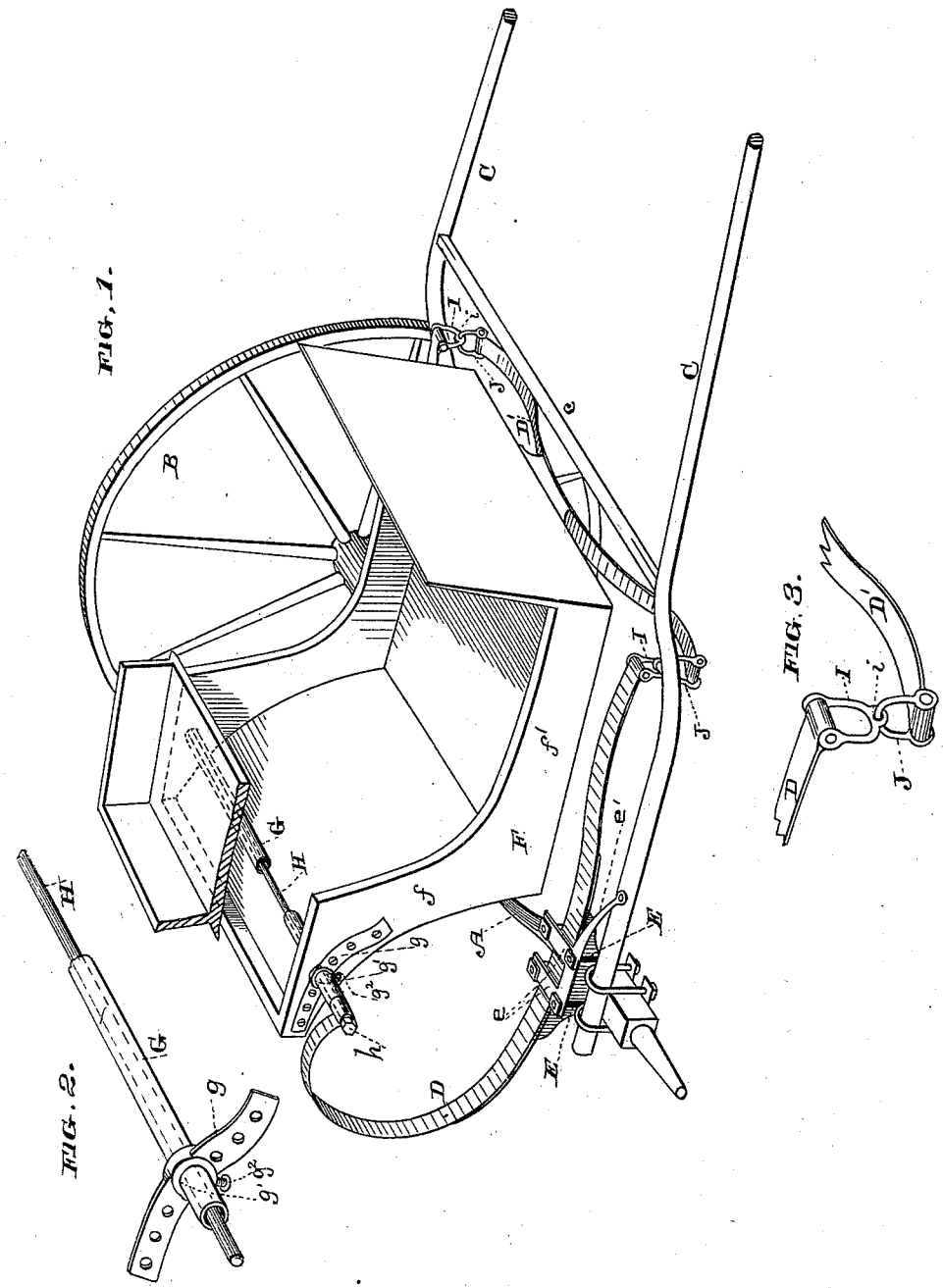

UNITED STATES PATENT OFFICE.

WILLIAM T. GOODMAN, OF FULTON, CALIFORNIA.

TWO-WHEELED VEHICLE.

SPECIFICATION forming part of Letters Patent No. 296,949, dated April 15, 1884.

Application filed January 14, 1884. (No model.)

*To all whom it may concern:*

Be it known that I, WILLIAM T. GOODMAN, of Fulton, county of Sonoma, in the State of California, have invented an Improvement in Two-Wheeled Vehicles; and I hereby declare the following to be a full, clear, and exact description thereof.

My invention relates to the class of two-wheeled vehicles, and to certain new and useful improvements therein, having for their object the prevention of that rocking motion which is occasioned by the jogging of the horse, and to which vehicles of this class are liable.

My improvements consist in the arrangement and connection of springs, the means for mounting the body thereon, and a novel connection between springs, axle, and shaft, as I shall fully explain by reference to the accompanying drawings.

Figure 1 is a perspective view of my vehicle, one of the wheels and a portion of the seat being left off. Fig. 2 is an enlarged view of tube G, shaft H, and the holding-irons $g$. Fig. 3 is a view of the links I J.

A is the axle, and B are the wheels.

C are the shafts, clipped rigidly to the axle just within the wheels, and $c$ is the cross-bar of the shafts.

D are the side springs. These are flat springs, consisting, preferably, of two leaves at their middles, the under one being short and the upper one long, whereby the ends of the spring are made soft and easy. These springs are clipped rigidly to the axle, with an intervening block just within the shafts. The clips E, which secure them, embrace the axle from below and take the yoke $e$ above the spring. This yoke is preferably made integral with a side arm, $e'$, which extends forward and is curved to the shaft, to which it is secured. This connection between the springs, axle, and shafts gives extra rigidity to the parts, and is simple and effective. The rear ends of the springs D curve upward and forward, as shown, and their forward ends have a slight curve downward.

F is the body, formed of a raised seat portion, $f$, and a foot portion, $f'$. Through the seat portion $f$ of the body, immediately under the actual seat, is passed a pipe, G, through which a rod or shaft, H, extends, its ends projecting on each side. The rod is fitted loosely in the pipe, which serves as a boxing therefor. The curved rear ends of springs D are curled on the projecting ends of the rod H, which thus forms a pivot for the springs. Nuts $h$ on the ends of the rod secure the springs between themselves and the ends of pipe G; and in order to prevent any side movement of the body, and to keep the pipe G from rocking, I have the irons $g$. These are provided with an eye, $g'$, which fits over the pipe G, and is secured by a set-screw, $g^2$. The irons lie close up to the outside of the body, and are bolted thereto, as shown. In the forward ends of the springs D are pivoted links I, having the bottom portions formed with a small loop or hole, $i$.

D' is the front cross-spring, on which, through the intervention of a suitable block, the foot portion of the body rests and is secured. In the ends of the cross-spring are pivoted links J, which pass through the loops $i$ of links I.

In order to prevent the unpleasant motion of a cart, the first necessity is to so hang the body that it shall have a certain degree of independence, whereby the motion which is ordinarily imparted to it by the shafts may be counteracted by the weight of the rider. In my cart it will be seen that the body may move readily independent of its springs, for its rear portion turns on the shaft H, and its front portion moves on the links I J. Therefore, even if the springs could oscillate the shaft H, it would have no effect on the body; but this even cannot be done, as the springs are pivoted on the shaft.

The reason for making the loops $i$ in the forward links, I, is to prevent the links J from jumping, as they would do if they passed through the wide portion of the links I; but they fit the small loops closely enough to prevent any undue motion, and yet allow the links I to have their proper swing.

On account of the character of the springs themselves and the manner in which the body is hung, the vehicle is a very easy riding one, and no unpleasant motion is perceptible.

Having thus described my invention, what I claim as new, and desire to secure by Letters Patent, is—

1. In a two-wheeled vehicle, the side springs, D, having upwardly and forwardly curved rear ends, and the front cross-spring, D', connected with the side springs by links, in combination with the body F, supported in front on the cross-spring, and having a cross-shaft, H, loosely mounted or journaled through its rear or seat portion, said shaft having its projecting ends journaled in rear curved ends of the side springs, substantially as herein described.

2. In a two-wheeled vehicle, the side springs, D, having curved rear ends, and front cross-spring, D', in combination with the body F, having pipe G through its seat portion, and the transverse pivot-shaft H, on the ends of which the curved rear ends of the side springs are pivoted, substantially as herein described.

3. In a two-wheeled vehicle, the side springs, D, having the links I pivoted in their forward ends, said links having the small bottom loops, $i$, in combination with the front cross-spring, D', having in its ends the pivoted links J, passing through the small loops $i$, substantially as and for the purpose herein described.

4. In a two-wheeled vehicle, the axle A and shafts C, clipped thereto, in combination with the springs D, the clips E, securing them to the axle, and the yoke $e$, having arm $e'$, secured to the shafts, substantially as and for the purpose herein described.

In witness whereof I have hereunto set my hand.

WILLIAM T. GOODMAN.

Witnesses:
FRED. G. NAGLE,
OUFRIED DE BENDELEBEN.